US008292724B2

(12) United States Patent
Marks et al.

(10) Patent No.: US 8,292,724 B2
(45) Date of Patent: Oct. 23, 2012

(54) METHODS OF EXPANDING SYMBOLS BASED UPON RELATIVE LOCATION OR SAID SYMBOLS TO EACH OTHER IN A SYMBOL MATRIX

(75) Inventors: Daniel Mordecai Marks, Cold Spring, NY (US); Anthony Mark Singer, Ramsey, NY (US)

(73) Assignee: PTT LLC, Mahwah, NJ (US)

( * ) Notice: Subject to any disclaimer, the term of this patent is extended or adjusted under 35 U.S.C. 154(b) by 1150 days.

(21) Appl. No.: 12/012,399

(22) Filed: Feb. 1, 2008

(65) Prior Publication Data

US 2008/0188280 A1 Aug. 7, 2008

Related U.S. Application Data

(60) Provisional application No. 60/899,581, filed on Feb. 5, 2007.

(51) Int. Cl.
*A63F 13/00* (2006.01)

(52) U.S. Cl. ................. 463/20; 463/16; 463/21; 463/25

(58) Field of Classification Search .............. 463/16–20, 463/21, 25
See application file for complete search history.

(56) References Cited

U.S. PATENT DOCUMENTS 7,070,502 B1 * 7/2006 Bussick et al. .................. 463/20

* cited by examiner

*Primary Examiner* — Peter DungBa Vo
*Assistant Examiner* — Damon Pierce
(74) *Attorney, Agent, or Firm* — Holland & Hart LLP

(57) ABSTRACT

The present invention expands a wildcard symbol into one or more symbol positions of the symbol matrix if two or more wildcard symbols appear in the symbol matrix in a predetermined configuration relative to one another. In a preferred embodiment of the present invention, two or more wildcard symbols appearing in adjacent positions of the same row of a symbol matrix expand into all symbol positions of the columns in which the adjacent wildcard symbols appear.

15 Claims, 4 Drawing Sheets

METHODS OF EXPANDING SYMBOLS BASED UPON RELATIVE LOCATION OR SAID SYMBOLS TO EACH OTHER IN A SYMBOL MATRIX

PRIORITY CLAIM

This application is a non-provisional patent application that claims priority to and the benefit of U.S. Provisional Patent Application Ser. No. 60/899,581, filed Feb. 5, 2007, incorporated herein by reference.

COPYRIGHT NOTICE

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF INVENTION

In general, the present invention relates to new methods of operating a slot machine game and, in particular, relates to new methods of expanding symbols in the symbol matrix of a slot machine game.

BACKGROUND OF THE INVENTION

To play a conventional slot machine, the player deposits money into the machine, sets the wager, and spins the reels. When the reels stop spinning, the player collects credits for winning symbol combinations displayed on the reels, if any, according to a predetermined pay schedule.

While the appearance of conventional slot machines may change from one theme, such as space aliens, to another theme, such as farm animals, the underlying methods of play—setting the wager, spinning the reels, collecting awards—remain the same from machine to machine.

One example of the similar methods used by conventional slot machine games is wildcard symbols which act as other symbols to help form additional winning symbol combinations. In a common variation, a wildcard symbol appearing anywhere in the symbol matrix expands into all positions of the column in which the wildcard symbol appeared.

The many similarities of conventional slot machines, such as wildcard symbols, limit the value of the slot machine games for players, casinos, and manufacturers. Players tire of the same methods of play; casinos cannot distinguish their games from other casinos; and manufacturers cannot distinguish their products from other manufacturers.

Therefore, new methods of playing slot machine games, including new ways of using and expanding symbols in the symbol matrix, are required to enhance the value of these games to players, casinos, and manufacturers.

SUMMARY OF THE INVENTION

The present invention expands a symbol into one or more symbol positions of the symbol matrix if two or more symbols appear in the symbol matrix in a predetermined configuration relative to one another.

In a preferred embodiment of the present invention, two or more wildcard symbols appearing in adjacent positions of the same row of a symbol matrix expand into all symbol positions of the columns in which the adjacent wildcard symbols appear. The expanded wildcard symbols replace any symbols previously displayed in the symbol positions.

Following expansion of the symbols, the game determines winning symbol combinations in accordance with the game's award schedule. In the preferred embodiment, each of the expanded wildcard symbols may act as other symbols to help form winning symbol combinations.

BRIEF DESCRIPTION OF THE DRAWINGS

The accompanying figures illustrate various stages of the preferred Replicating Wilds embodiment of the present invention.

DESCRIPTION OF A PREFERRED EMBODIMENT

Figure 1:
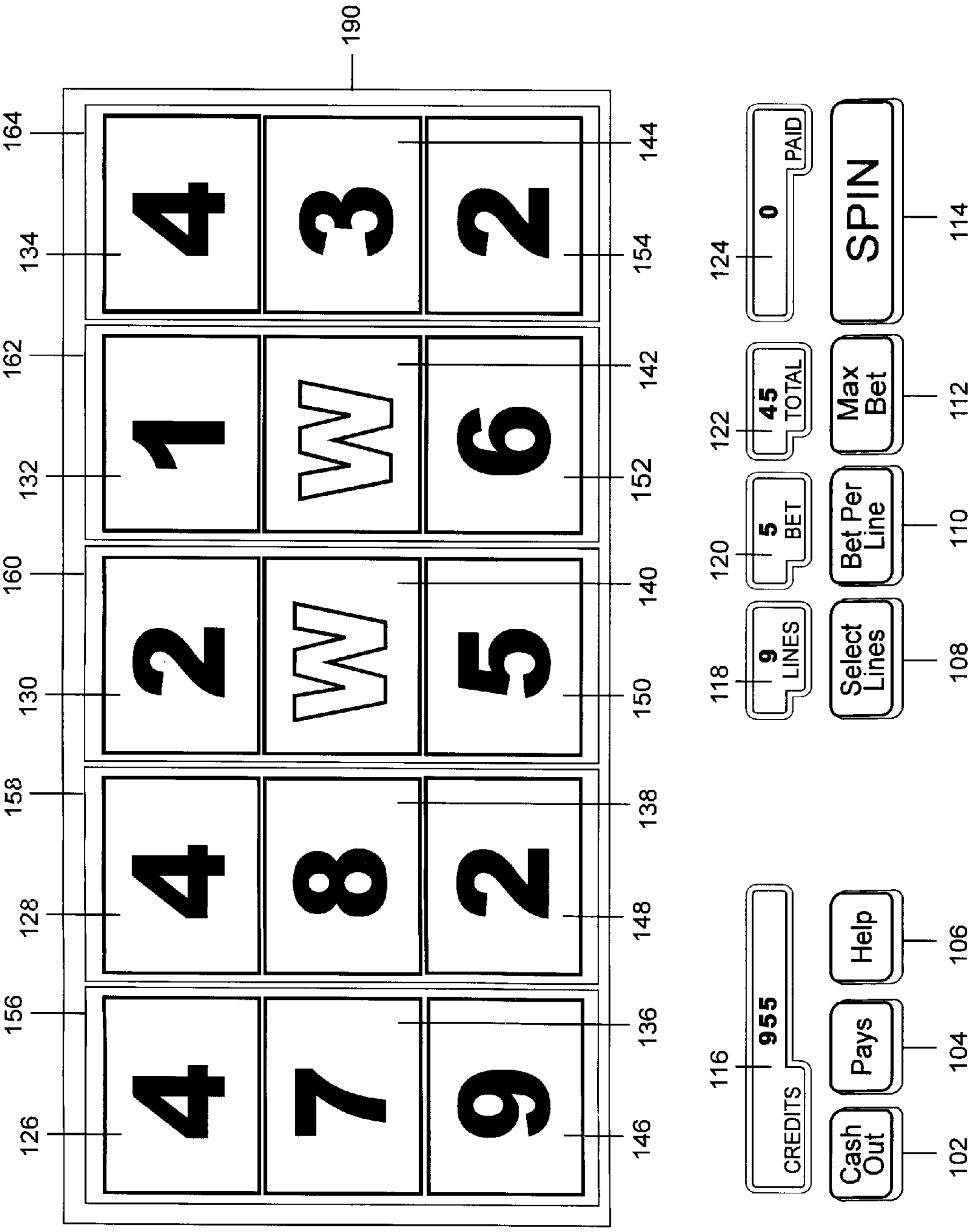
FIG. 1 shows wildcard symbols in the middle positions of the third and fourth columns of a symbol matrix.

To play a preferred embodiment of the present invention, the player initializes credits, sets the wager, spins the reels, and collects awards for winning symbol combinations formed with or without wildcard symbols, as detailed below with reference to FIGS. 1 through 4 (collectively "the Figures"):

Initialize Credits. In the Figures, the player initializes credits by depositing money in the form of coins, gaming tokens or paper currency into a coin head (not shown) or bill acceptor (not shown). Coins and gaming tokens are collected in a reservoir (not shown) inside the gaming machine; paper currency is collected in the bill acceptor (not shown) inside the gaming machine.

If the coins, gaming tokens or paper currency are validated as authentic, the player accrues the appropriate number of playing credits on the Credit meter 116. More credits may be initialized, if necessary, by additional deposits. Alternatively, any method of initializing credits may be used including debit cards, credit cards, or other form of electronic funds transfer.

Set the Wager. In the Figures, the player sets the wager by selecting pay lines and setting the bet per pay line. The wager is calculated by multiplying the number of selected pay lines by the bet per pay line. For example, the player may wager five credits on each of nine pay lines for a total bet of forty-five credits. The total bet amount is displayed on the Total Bet meter 122.

To select pay lines, the player uses the Select Pay Lines button 108 and views the number of selected pay lines on the Select Pay Lines meter 118. Pay lines are selected in a predetermined order. For example, the first pay line selected is always pay line 1, second pay line selected is always pay line 2, etc. Alternatively, fewer or greater than nine pay lines may be used with any order of pay line activation.

To set the bet per pay line, the player uses the Bet Per Pay Line button 110 and views the amount bet per pay line on the Bet Per Pay Line meter 120. The same amount is wagered on each pay line. For example, up to five credits may be wagered on each pay line. Alternatively, wagers of any amount may be placed on a pay line, with the same or different amount wagered on each pay line.

In addition, the player may use the Bet Max button 112 to place the maximum bet per pay line on all pay lines. Alternatively, any wager may be assigned a button.

Spin the Reels. In the Figures, the player uses the Spin button 114 to randomly rearrange the symbols displayed in the symbol matrix 190. The symbol matrix 190 contains three symbol positions for each of the five slot reels 156-164 for a total of fifteen symbol positions 126-154. Alternatively, any number of reels with any number of symbol positions may be used.

The slot reels 156-164 spin and randomly stop one reel at-a-time, from left to right, until all five reels have stopped and all fifteen symbol positions 126-154 of the symbol matrix 190 are revealed. Alternatively, any size symbol matrix may be used and any method may be used to rearrange symbols in the symbol matrix.

Winning combinations with or without Wildcard Symbols. The player receives awards for winning symbol combinations formed by two or more, same, adjacent symbols, starting from the leftmost position of a pay line. For example, four "8" symbols (i.e. 8-8-8-8) is a winning symbol combination with an award of 10× the bet per line.

The player may also receive awards for winning symbol combinations formed using wildcards acting as other symbols in the symbol set. For example, three "8" symbols and a wildcard symbol ("W") acting as an "8" symbol (i.e. 8-8-8-W) is a winning symbol combination with an award of 10× the bet per line.

The use of a wildcard symbol to form a winning symbol combination does not affect the award value. For example, the winning combinations 8-8-8-8 and 8-8-8-W both award the same 10× the bet per line award. Alternatively, wildcard symbols and/or expanded wildcard symbols may affect the award value of winning combinations.

All winning symbol combinations, including combinations with and without wildcard symbols, are listed on a predetermined pay schedule (not shown) along with their award values. The player may view the pay schedule (not shown) by pressing the Pays button 104. In addition, the player may press the Help button 106 to view the rules of the game (not shown).

In FIG. 1, two wildcard symbols appear in adjacent symbol positions of the same row: the middle position 140 of the third column 160 and the middle position 142 of the fourth column 162. The appearance of wildcard symbols in adjacent positions of the same row cause these wildcard symbols to expand into all symbol positions of their respective columns.

Figure 2:
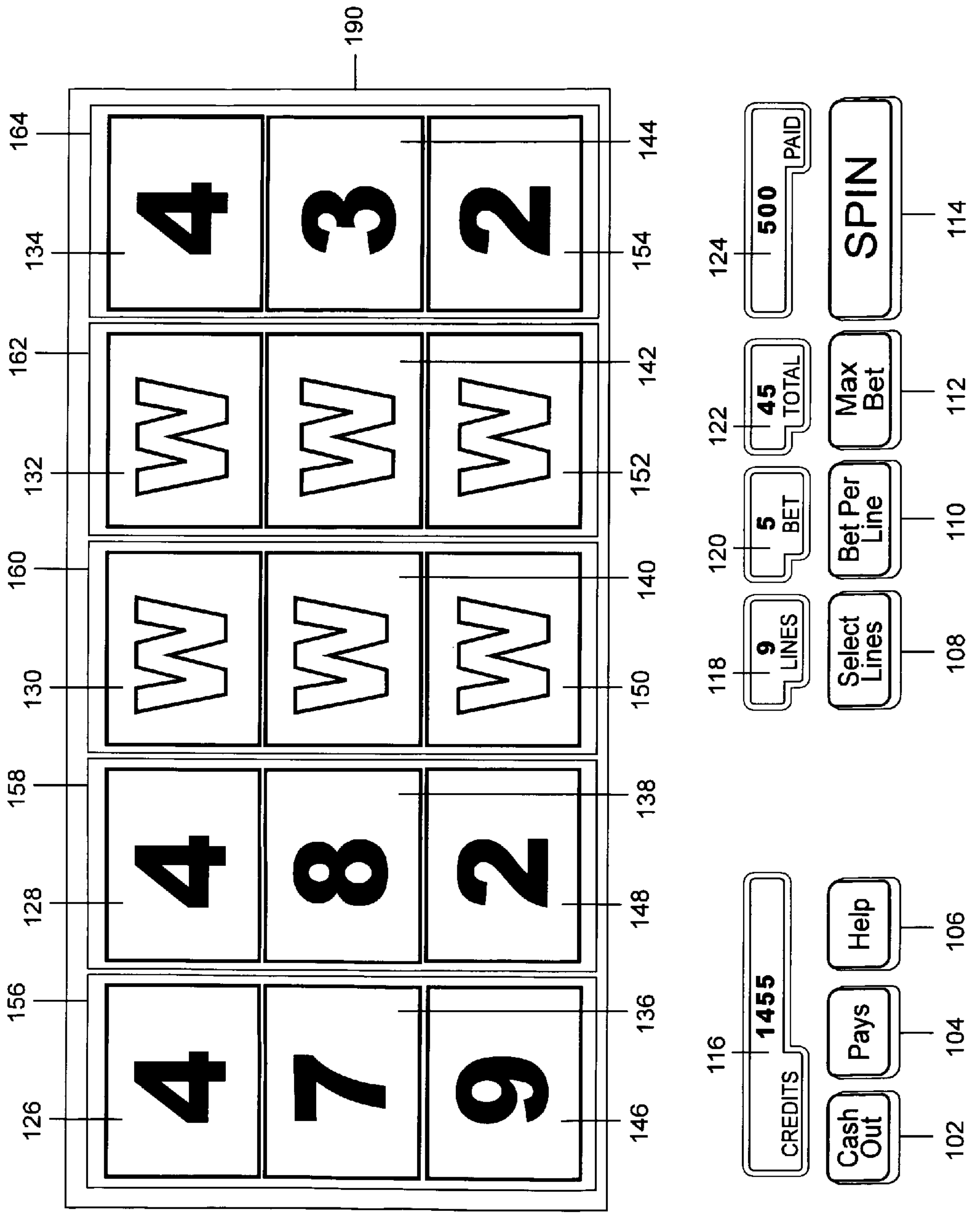
FIG. 2 shows expanded wildcard symbols in the top, middle and bottom positions of the third and fourth columns of a symbol matrix.

FIG. 2 shows the expansion of the two wildcard symbols into the following symbol positions: top 130 and bottom 150 positions of the third column 160; and top 132 and bottom 152 positions of the fourth column 162. The expanded wildcard symbols replace the symbols previously displayed in the symbol positions 130, 132, 150, 152.

The expanded wildcard symbols may act as other symbols to help form winning combinations. In particular, FIG. 2 shows the expanded wildcard symbols acting as "4" symbols to help form winning combinations of 4-4-W-W and 4-4-W-W-4. Each of these winning symbol combinations generate an award according to a predetermined pay schedule (not shown).

Upon issuance of awards, the credits are added to the player's balance of credits, as shown on the Credit meter 116. As long as the player has credits remaining on the Credit meter 116, the player may continue to play the gaming machine. The player may also collect the balance of credits by pressing the Cash Out button 102.

Figure 3:
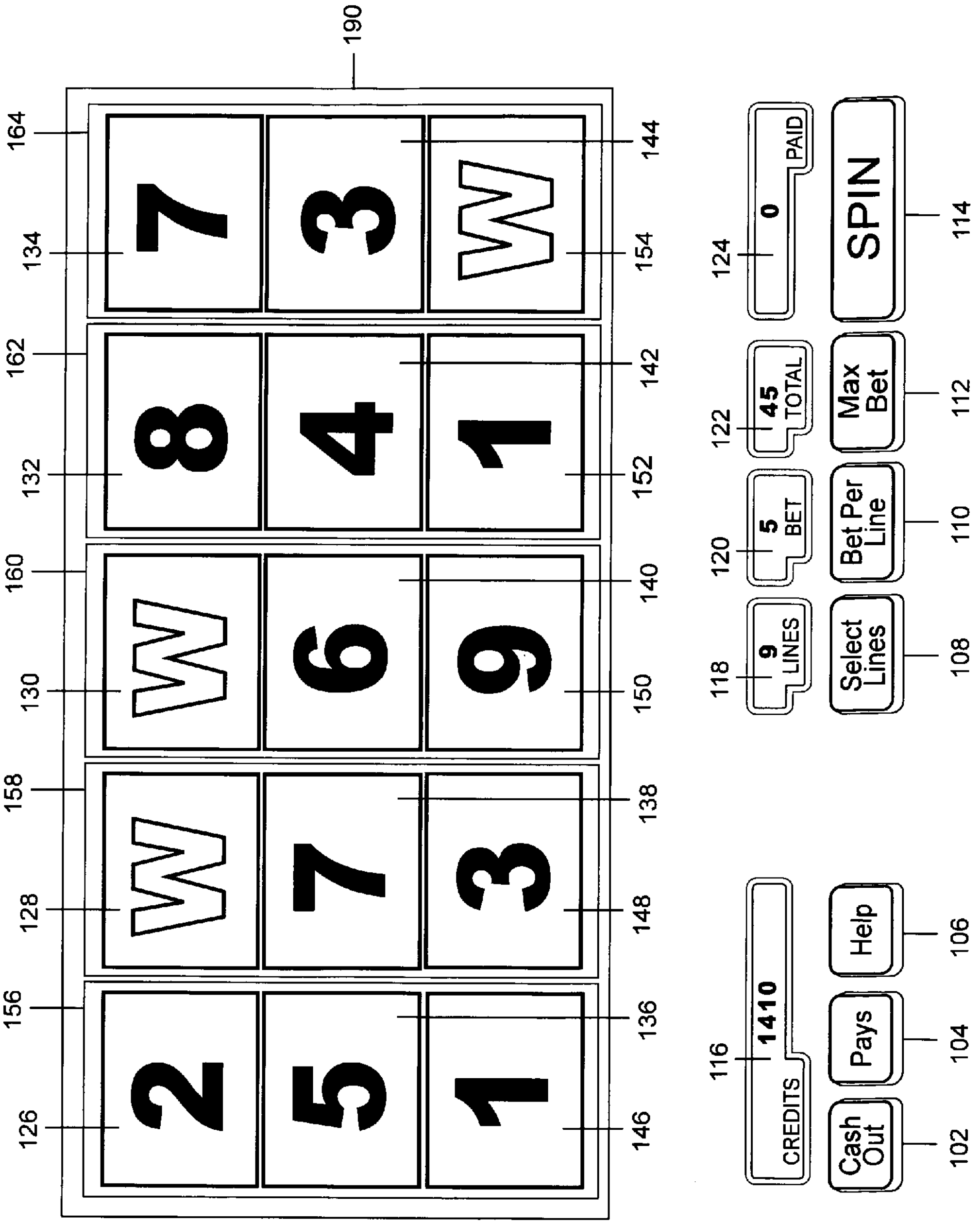
FIG. 3 shows wildcard symbols in the top position of the second column, top position of the third column, and bottom position of the fifth column of a symbol matrix.

In FIG. 3, two wildcard symbols appear in adjacent symbol positions of the same row: the top position 128 of the second column 158 and the top position 130 of the third column 160. In addition, a non-adjacent wildcard symbol appears in the bottom position 154 of the fifth column 164. The appearance of two wildcard symbols in adjacent positions of the same row cause these wildcard symbols to expand into all symbol positions of their respective columns; the non-adjacent wildcard symbol does not expand.

Figure 4:
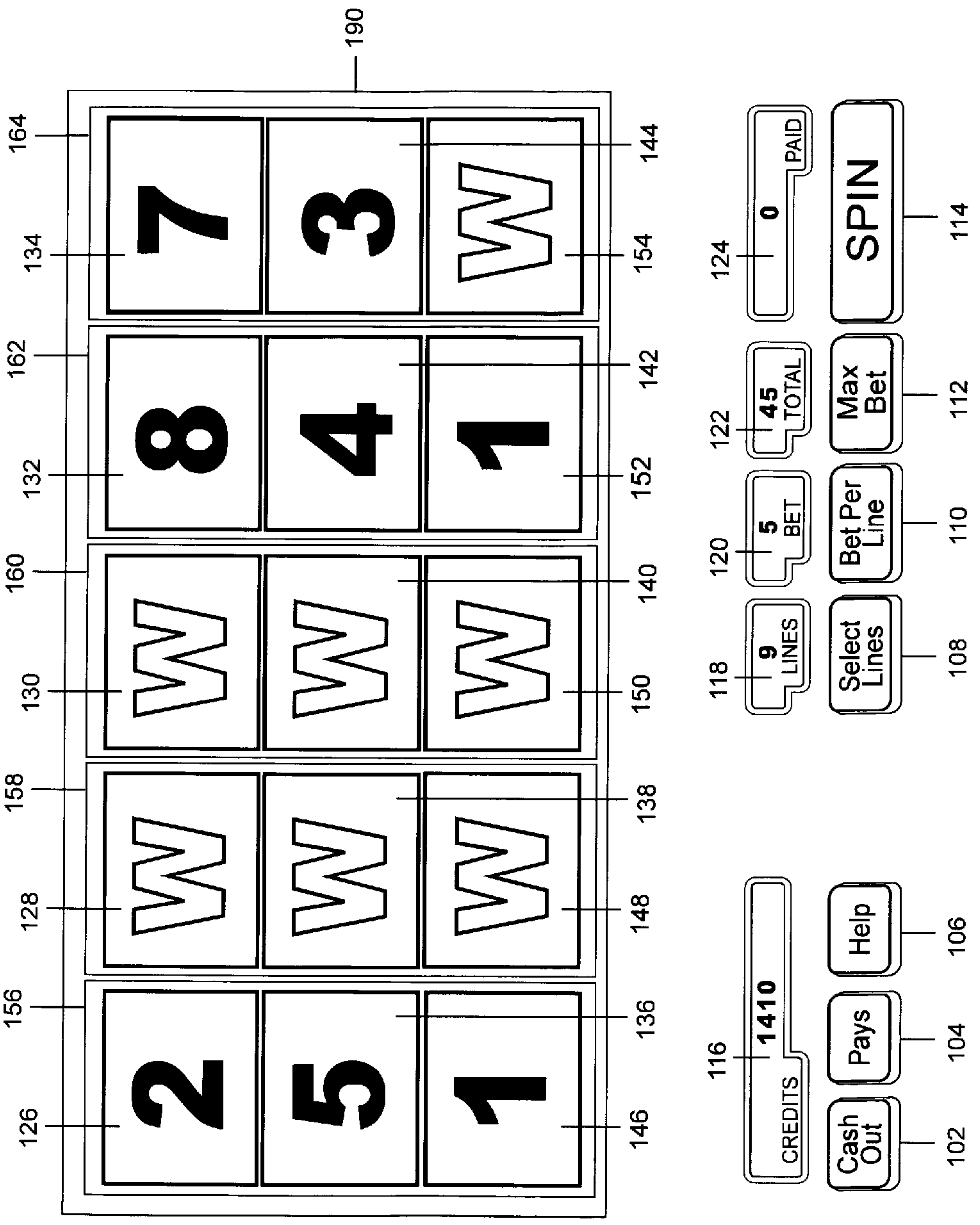
FIG. 4 shows expanded wildcard symbols in the top, middle and bottom positions of the second and third columns of a symbol matrix and an unexpanded wildcard symbol in the bottom position of the fifth column.

FIG. 4 shows the expansion of the two adjacent wildcard symbols into the following symbol positions: middle 138 and bottom 148 positions of the second column 158; and middle 140 and bottom 150 positions of the third column 160. The expanded wildcard symbols replace the symbols previously displayed in the symbol positions 138, 140, 148, 150. The non-adjacent wildcard symbol does not expand and, therefore, does not replace any symbols.

The expanded wildcard symbols act as other symbols to help form winning combinations. In particular, FIG. 4 shows the expanded wildcard symbols acting as "1" and "2" symbols to help form winning combinations of 2-W-W and 1-W-W-1. Each of these winning symbol combinations generate an award according to a predetermined pay schedule (not shown).

The non-expanded wildcard symbol may also act as other symbols to help form winning combinations. Further, the non-expanded wildcard symbol may work with expanded wildcard symbols to help form winning combinations. In particular, FIG. 4 shows the non-expanded wildcard symbol and expanded wildcard symbols acting as "1" symbols to help form winning combination of 1-W-W-1-W. This winning symbol combination generates an award according to a predetermined pay schedule (not shown).

Upon issuance of awards, the credits are added to the player's balance of credits, as shown on the Credit meter 116. As long as the player has credits remaining on the Credit meter 116, the player may continue to play the gaming machine. The player may also collect the balance of credits by pressing the Cash Out button 102.

DESCRIPTION OF ALTERNATIVE EMBODIMENTS

In addition to the preferred embodiment, the present invention may be modified in one or more aspects, including but not limited to the following alternative embodiments:

In one embodiment, symbols may expand when they appear in the symbol matrix in any predetermined configuration relative to one another. For example, a wildcard symbol may expand when it appears in the same column as another wildcard symbol.

In another embodiment, symbols may expand when they appear in the symbol matrix in any number of predetermined configurations relative to one another. For example, a wildcard symbol may expand when it is adjacent to one or more wildcard symbols or expand when it is in the same column as another wildcard symbol.

In another embodiment, symbols may expand in a manner dependent upon the predetermined configuration in which symbols appear relative to one another. For example, a wildcard symbol may expand into all symbol positions of the column when it is adjacent to another wildcard symbol or expand into all symbol positions of the row when it is on the same row as another wildcard symbol.

In another embodiment, any two or more symbols may expand when they appear in the symbol matrix in any predetermined configuration relative to one another. For example, non-wildcard symbol A may expand when it appears adjacent to another non-wildcard symbol A; or wildcard symbol X may only expand when it appears in the same column as non-wildcard symbol A.

In another embodiment, symbols may expand once two or more symbols appear in the symbol matrix in a predetermined configuration relative to one another. For example, wildcard symbol X may only expand when it appears adjacent to another wildcard symbol X and in the same column as non-wildcard symbol A.

In another embodiment, expanded symbols may remain in the symbol matrix for any duration, including spins, time, wins, losses, or wagers. For example, a wildcard symbol may remain expanded within the symbol matrix for 3 spins plus an additional 20 seconds.

In another embodiment, expanded symbols may offer any type of award, such as credits, currency, free spins, or bonus games. For example, the game may award 5 free spins for each winning combination formed using an expanded symbol.

In another embodiment, expanded symbols may offer any type of award enhancement. For example, the game may provide 5× the standard award for each winning combination formed using an expanded symbol.

In another embodiment, the present invention may only occur with placement of an additional or side-bet wager. For example, an additional wager of 10 credits activates the ability to expand symbols.

In another embodiment, the present invention may be used a feature during the primary game. In another embodiment, the present invention may be used as a feature during a secondary or bonus game.

SCOPE & SPIRIT OF THE PRESENT INVENTION

The many features and advantages of the present invention are apparent from the descriptions of the preferred and alternative embodiments. The present invention, however, is not limited to these particular embodiments, as the invention is capable of being practiced and carried out in various ways. For example, new features may be added to an existing embodiment or features from two or more embodiments may be combined to produce a new embodiment. Further, features mentioned in any embodiment may be interchanged with similar features not mentioned that perform the same or similar functions. And, finally, the phraseology and terminology used to explain the embodiments are only descriptive and should not be regarded as limiting. The claims, therefore, seek to cover all features and advantages that fall within the true spirit and scope of the present invention.

We claim:

1. A method of playing a game using a game symbol location matrix in which a plurality of game symbols can appear within at least one game symbol row of row of game symbol locations intersecting a plurality of game symbol columns of column game symbol locations within the game symbol matrix, the game playing method comprising:

a) providing at least one game symbol expansion property for at least one predetermined relative game symbol location configuration in the game symbol location matrix;

b) associating a game symbol expansion property at a predetermined relative game symbol location configuration with a predetermined set of first game symbols, including wild game symbols appearing in adjacent locations;

c) displaying an arrangement of a plurality of game symbols in a resulting game symbol matrix within the game symbol location matrix;

d) assessing whether a plurality of said game symbols in the resulting game symbol matrix are displayed in at least one predetermined relative game symbol location configuration and if so:

(i) expanding at least one game symbol in another game symbol location in accordance with said associated game symbol expansion property and displaying an expanded resulting game symbol arrangement;

(ii) determining whether at least one winning combination of game symbols is formed in the resulting game symbol arrangement; and (iii) issuing awards indicia if the determining step determines the occurrence of one or more winning combinations of game symbols is formed in said resulting game symbol arrangement.

2. The game playing method of claim 1 in which wildcard game symbols expand to adjacent game symbol locations in the same row of the resulting game symbol arrangement.

3. The game playing method of claim 1 in which wildcard game symbols expand into all game symbol locations in the same columns within the resulting game symbol matrix in which said wildcard game symbols appear.

4. The game playing method of claim 1 further comprising offering to enable one or more additional game symbol expansion properties in exchange for an additional predetermined wager amount; assessing if said additional predetermined wager amount was wagered; and enabling said one or more additional game symbol expansion properties if the assessing step determines that said additional predetermined wager amount was wagered.

5. A method of playing a game using a game symbol location matrix in which a plurality of game symbols can appear within at least one game symbol row of row of game symbol locations intersecting a plurality of game symbol columns of column game symbols locations within the game symbol matrix, the game playing method comprising:

a) providing at least one game symbol expansion property for at least one predetermined relative game symbol location configuration in the game symbol location matrix;

b) associating a game symbol expansion property at a predetermined relative game symbol location configuration with a predetermined set of first game symbols that include wildcard and non-wildcard symbols appearing in adjacent locations;

c) displaying an arrangement of a plurality of game symbols in a resulting game symbol location within the game symbol location matrix;

d) assessing whether a plurality of said game symbols in the resulting game symbol matrix are displayed in at least one predetermined relative game symbol location configuration and if so:

(i) expanding at least one said game symbol in another game symbol location in accordance with said associated game symbol expansion property and displaying an expanded resulting game symbol arrangement;

(ii) determining whether at least one winning combination of game symbols is formed in the resulting game symbol arrangement; and (iii) issuing award indicia if the determining step determines the occurrence of one or more winning combinations of game symbols formed in said resulting game symbol arrangement.

6. The game playing method of claim 5 wherein expanding a game symbol in accordance with a game symbol expansion property requires a pre-occurring display of a predetermined minimum number of identified game symbols within the set of game symbol locations identified by the associated predetermined relative game symbol location configuration.

7. The game playing method of claim 5 further comprising offering to enable one or more additional game symbol expansion properties in exchange for an additional predetermined wager amount; assessing if said additional predetermined wager amount was wagered; and enabling said one or more additional game symbol expansion properties if the assessing step determines that said additional predetermined wager amount was wagered.

8. A method of playing a game using a game symbol location matrix including a plurality of symbols, the game playing method comprising:

a) providing at least one game symbol expansion property for at least one predetermined relative game symbol location configuration in the game symbol location matrix;

b) associating a game symbol expansion property at a predetermined relative game symbol location configuration with a predetermined set of first game symbols, including wild game symbols appearing in adjacent locations;

c) displaying a first arrangement of a plurality of game symbols in a resulting game symbol matrix within the game symbol location matrix;

d) assessing whether a plurality of said game symbols in the resulting game symbol matrix are displayed in at least one predetermined relative game symbol location configuration and if so:

(i) expanding said at least one game symbol in another game symbol location in accordance with said associated game symbol expansion property and displaying an expanded resulting game symbol arrangement;

(ii) determining if a winning combination of game symbols is formed in the resulting game symbol arrangement;

(iii) issuing award indicia if the determining step determines the occurrence of one or more winning combinations of game symbols formed in said resulting game symbol arrangement; and (iv) while displaying a second game symbol arrangement of at least one game symbol in a resulting game symbol matrix within the game symbol location matrix, maintaining at least one expanded game symbol in said another location for a period of time.

9. The game playing method of claim 8 wherein said period of time is determined by the completion of a predetermined number of iterations of steps d(i) through d(iv).

10. The game playing method of claim 8 wherein said period of time is determined by repeated wagering of a predetermined wager amount.

11. The game playing method of claim 8 wherein said period of time is determined by obtaining a predetermined number of determinations where the determining step d(ii) determines the absence of one or more winning combinations of game symbols formed in said resulting game symbol arrangement.

12. The game playing method of claim 8 wherein said period of time is determined by obtaining a predetermined number of determinations where the determining step d(ii) determines the presence of one or more winning combinations of game symbols formed in said resulting game symbol arrangement.

13. The game playing method of claim 8 further comprising, offering to enable one or more game symbol expansion properties in exchange for a first predetermined wager amount; assessing if said first predetermined wager amount was wagered; enabling said one or more game symbol expansion properties if the assessing step determines that said first predetermined wager amount was wagered.

14. The game playing method of claim 13 further comprising, offering to enable one or more additional game symbol expansion property in exchange for a second predetermined wager amount; assessing if said second predetermined wager amount was wagered; enabling said one or more game symbol expansion properties if the assessing step determines that said second predetermined wager amount was wagered.

15. The game playing method of claim 13 further comprising offering to enable one or more additional game symbol expansion properties in exchange for an additional predetermined wager amount; assessing if said additional predetermined wager amount was wagered; and enabling said one or more additional game symbol expansion properties if the assessing step determines that said additional predetermined wager amount was wagered.

* * * * *